United States Patent
Liu et al.

(10) Patent No.: US 12,267,892 B2
(45) Date of Patent: Apr. 1, 2025

(54) DATA TRANSMISSION FOR ARTIFICIAL INTELLIGENCE (AI) TECHNOLOGIES

(71) Applicant: ZTE Corporation, Guangdong (CN)

(72) Inventors: Zhuang Liu, Guangdong (CN); Yin Gao, Guangdong (CN); He Huang, Guangdong (CN); Dapeng Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 448 days.

(21) Appl. No.: 17/871,612

(22) Filed: Jul. 22, 2022

(65) Prior Publication Data

US 2022/0361262 A1 Nov. 10, 2022

Related U.S. Application Data

(63) Continuation of application No. PCT/CN2020/120543, filed on Oct. 13, 2020.

(51) Int. Cl.
*H04L 12/00* (2006.01)
*H04W 76/12* (2018.01)
*H04W 76/15* (2018.01)

(52) U.S. Cl.
CPC ........... *H04W 76/12* (2018.02); *H04W 76/15* (2018.02)

(58) Field of Classification Search
CPC ......... H04W 76/12; H04W 76/15; H04B 7/26
USPC .................................................. 370/328, 344
See application file for complete search history.

(56) References Cited

U.S. PATENT DOCUMENTS

| | | | |
|---|---|---|---|
| 8,737,348 B2 * | 5/2014 | Oh | H04L 5/001 370/344 |
| 10,797,934 B1 | 10/2020 | Akman et al. | |
| 11,963,030 B2 * | 4/2024 | Kim | H04W 52/0229 |
| 12,082,003 B2 * | 9/2024 | Dussmann | H04W 24/08 |
| 2017/0235437 A1 * | 8/2017 | Aguilar | G06Q 10/10 715/811 |
| 2020/0028705 A1 * | 1/2020 | Kim | H04L 67/10 |
| 2024/0107609 A1 * | 3/2024 | Kim | H04W 76/19 |

FOREIGN PATENT DOCUMENTS

| | | | |
|---|---|---|---|
| CN | 101541093 A | | 9/2009 |
| CN | 101686558 A | * | 3/2010 |

OTHER PUBLICATIONS

Chai et al., Method, device and system for establishing dynamic communication interface, 2010, 11 pages (Year: 2010).*
International Search Report and Written Opinion for International Application No. PCT/CN2020/120543, mailed on Jul. 9, 2021 (6 pages).

* cited by examiner

*Primary Examiner* — Frantz Coby
(74) *Attorney, Agent, or Firm* — Perkins Coie LLP (57) ABSTRACT

Techniques are described to trigger, by a first entity, a process by which one or more interfaces are established over a user plane or a control plane between the first entity and a second entity, where the triggering is based on a first communication of a first message between the first entity and the second entity, and where the one or more interfaces are used for data communication between the first entity and the second entity; and establish, by the first entity, the one or more interfaces by performing a second communication of a second message between the first entity and the second entity in response to the first communication.

20 Claims, 6 Drawing Sheets

DATA TRANSMISSION FOR ARTIFICIAL INTELLIGENCE (AI) TECHNOLOGIES

CROSS REFERENCE TO RELATED APPLICATIONS

This patent document is a continuation of and claims benefit of priority to International Patent Application No. PCT/CN2020/120543, filed on Oct. 13, 2020. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed to enable or support data transmission for Artificial Intelligence (AI) based technologies. An example wireless communication method includes triggering, by a first entity, a process by which one or more interfaces are established over a user plane or a control plane between the first entity and a second entity, where the triggering is based on a first communication of a first message between the first entity and the second entity, and where the one or more interfaces are used for data communication between the first entity and the second entity; and establishing, by the first entity, the one or more interfaces by performing a second communication of a second message between the first entity and the second entity in response to the first communication.

In some embodiments, the one or more interfaces are established over the user plane, the first message comprises a first set of one or more user plane (UP) transport layer information, the second message comprises a second set of one or more UP transport layer information, and each UP transport layer information in the first set and the second set indicates an interface and comprises a General Packet Radio Service (GPRS) Tunneling Protocol (GTP) tunnel Internet Protocol (IP) address and a GTP tunnel endpoint identifier. In some embodiments, at least one UP transport layer information in the first set or the second set comprises an object identifier that identifies an object for which data is transmitted or received via an interface indicated by the at least one UP transport layer information. In some embodiments, the object identifier includes a User Equipment (UE) identifier, a cell identifier, a slice identifier, a base station identifier, an Artificial Intelligence (AI) session identifier, a measurement identifier, or a Quality of Service (QoS) flow identifier.

In some embodiments, the first set of one or more UP transport layer information comprises a first set of one or more GTP IP addresses that are different from a second set of one or more GTP IP addresses included in the second set of one or more UP transport layer information. In some embodiments, the first set of one or more UP transport layer information comprises a first set of one or more GTP tunnel endpoint identifiers, the second set of one or more UP transport layer information comprises a second set of one or more GTP tunnel endpoint identifiers, and the first set of one or more GTP tunnel endpoint identifiers are different from the second set of one or more GTP tunnel endpoint identifiers, or at least some of the first set of one or more GTP tunnel endpoint identifiers are same as the second set of one or more GTP tunnel endpoint identifiers.

In some embodiments, the one or more interfaces are established over the control plane, the first message comprises a first set of one or more Control Plane (CP) transport layer addresses, the second message comprises a second set of one or more CP transport layer addresses, and each CP transport layer address in the first set and the second set indicates an interface and comprises two Internet Protocol (IP) addresses associated with establishing Stream Control Transmission Protocol (SCTP) connection and one SCTP port number.

In some embodiments, at least one CP transport layer address in the first set or the second set comprises an object identifier that identifies an object for which data is transmitted or received via an interface indicated by the at least one CP transport layer address. In some embodiments, the object identifier includes a User Equipment (UE) identifier, a cell identifier, a slice identifier, a base station identifier, an Artificial Intelligence (AI) session identifier, a measurement identifier, or a Quality of Service (QoS) flow identifier. In some embodiments, all of the data communication between the first entity and the second entity are performed over the one or more interfaces established over the user plane, or all of the data communication between the first entity and the second entity are performed over the one or more interfaces established over the control plane, or at least some the data communication between the first entity and the second entity are performed over a first interface established over the user plane and at least some of the data communication between the first entity and the second entity are performed over a second interface established over the control plane.

In some embodiments, the data communication is performed over the user plane by using a packet having a pre-defined General Packet Radio Service (GPRS) Tunneling Protocol-User (GTP-U) format. In some embodiments, the packet having the GTP-U format includes a GTP-U header that comprises one or more of: a payload type that indicates whether a payload of the packet includes Artificial Intelligence (AI) related data, or AI related control message, or data that is not related to AI, an AI message type that indicates which AI related control message is included in the payload, an encode or decode method type that identifies a technique with which to decode the payload, and an object identifier that indicates an object to which the payload is related or associated. In some embodiments, the object includes a User Equipment (UE), a cell, a slice, a base station, an AI session, a measurement session, or a Quality of Service (QoS) flow. In some embodiments, the data communication is performed over the control plane by using a packet having a Stream Control Transmission Protocol (SCTP) format. In some embodiments, the packet having the SCTP format includes a payload that comprises one or more of: a payload type that indicates whether the payload of the packet includes Artificial Intelligence (AI) related data, or AI related control message, or data that is not related to AI, an AI message type that indicates which AI related control message is included in the payload, an encode or decode method type that identifies a technique with which to decode the payload, and an object identifier that indicates an object to which the payload is related or associated.

In some embodiments, the object includes a User Equipment (UE), a cell, a slice, a base station, an AI session, a measurement session, or a Quality of Service (QoS) flow. In some embodiments, the first entity comprises a first artificial intelligence (AI) operated entity, and the second entity comprises a second AI operated entity. In some embodiments, the first entity or the second entity are located in a radio access network (RAN) network node or in a core network or in an Operations, Administration and Maintenance (OAM) server.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

A smart wireless network can be developed by enabling Artificial Intelligence (AI) technologies based on big data. In addition to 5G's typical demands for energy efficiency, load balancing, mobility management and coverage optimization, the general principle and functional framework of AI-based 5G wireless network can be further developed for smart wireless networks.

Figure 1:
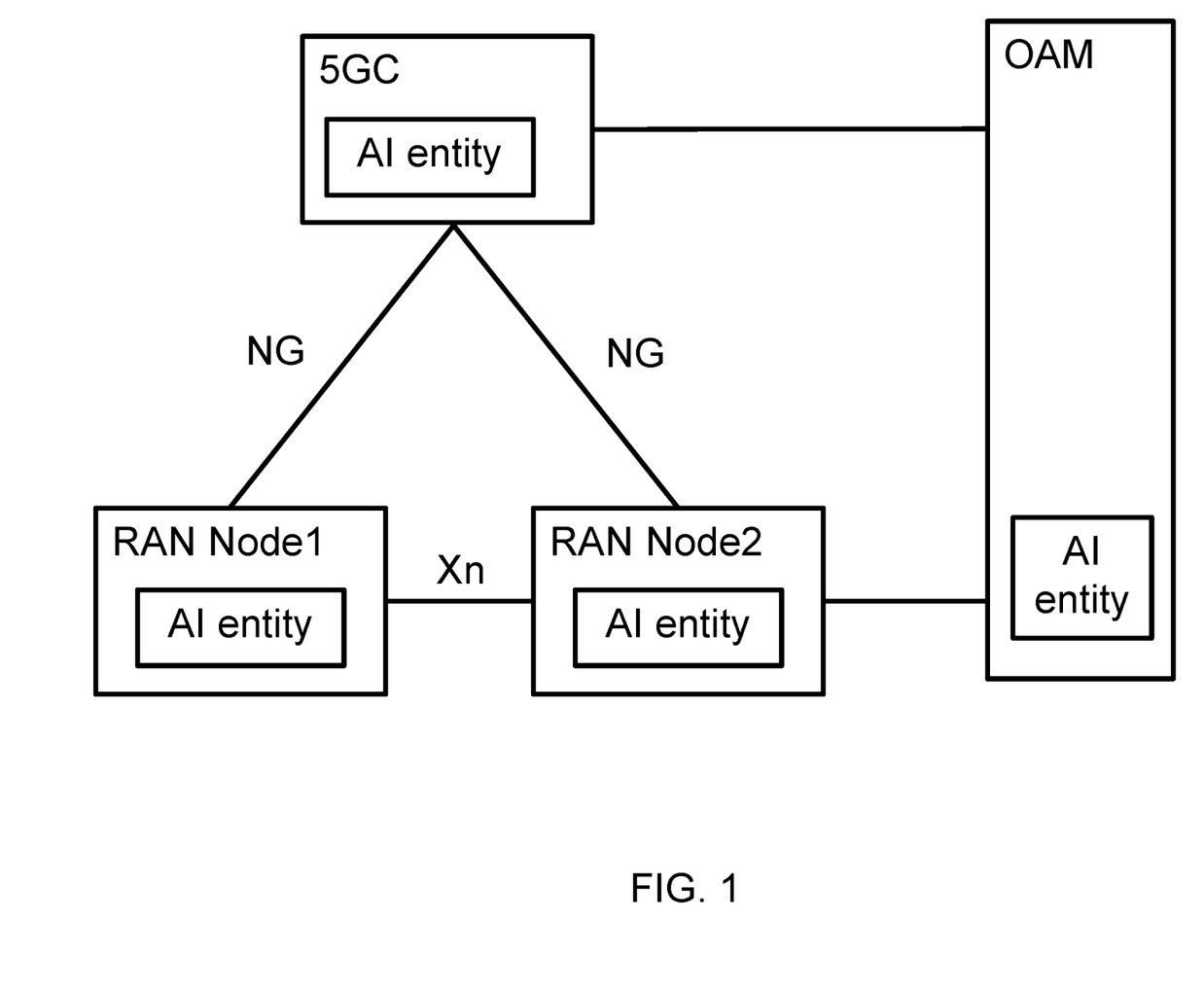
FIG. 1 shows an example block diagram of an Artificial Intelligence (AI)-based Radio Access Network (RAN) architecture.

The AI entity could be described as a logical function entity that enables intelligent control and optimization of Radio Access Network (RAN) elements and resources via data collection. The AI entities can be in different geographic locations, integrated in different RAN nodes, or as separate entities, e.g., AI servers. Currently, there is no solution for establishing an interface for data input and output between AI entities in a wireless network (e.g., 3GPP network), and there is no solution for how to transfer signaling control message in wireless network for AI function management, AI model management, and AI measurement management, etc., FIG. 1 shows an example block diagram of a Next Generation Radio Access Network (NG-RAN) architecture and interfaces enabled to support AI. FIG. 1 shows that an AI entity can be located in the 5G Core Network (5GC), the Operations, Administration and Maintenance (OAM), and in one or more RAN nodes (e.g., one or more eNB or one or more base stations).

In current NG-RAN network, the Xn interface, F1 interface (between Central Unit (CU) and Distributed Unit (DU)), and the NG interface includes user plane interface over GPRS Tunneling Protocol (GTP-U) e.g., Xn-U, F1-U, NG-U interface, and includes control interface over Stream Control Transmission Protocol (SCTP), e.g., Xn-C, F1-C, NG-C interface. The existing open standardized backhaul interface, e.g., Xn, F1, NG interface cannot support data input and output between AI entities, and cannot support transmitting signaling control message for AI function management, AI model management, and AI measurement management, etc.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Embodiment 1—Establishing AI Interface Over User Plane

Figure 2:
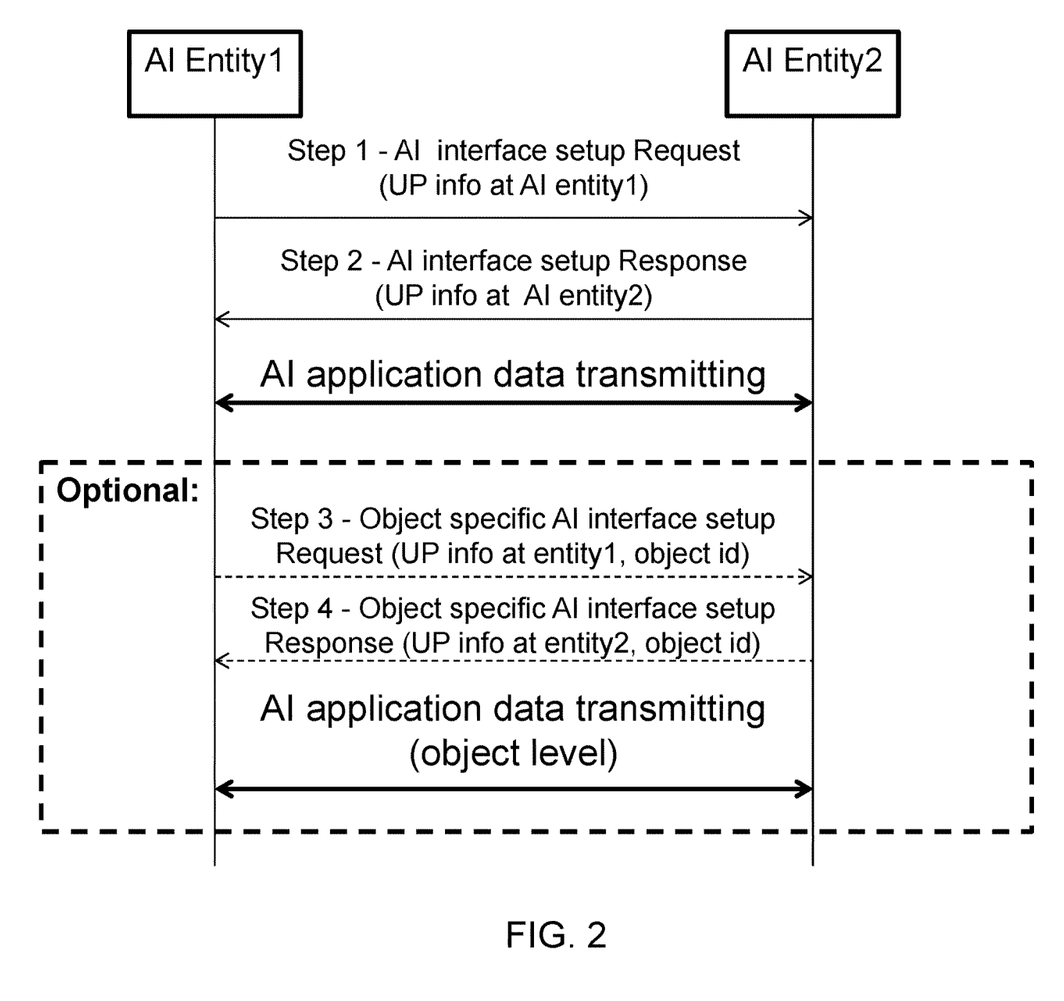
FIG. 2 shows an example flow diagram for establishing an AI interface over user plane between two AI entities.

FIG. 2 shows an example flow diagram for establishing an AI interface over user plane between two AI entities. In some embodiments, one of the purposes of the example AI interface Setup procedure is to establish an interface over GTP-U to exchange AI application level data between the AI entities. There may be one or more common AI interface instances established to transmit all AI-related data between two AI entities, and one or more specific object level AI interface instances established to transmit AI-related data of the corresponding object between two AI entities. The steps shown in FIG. 2 are further described below.

Step 1: The AI entity1 sends a request message (e.g., AI interface Setup Request, F1 setup request, Xn setup request, or NG setup request, etc.,) to the AI entity2 to establish one or more common AI interface to exchange AI application level data between AI entity1 and AI entity2. The request message may carry one or more user plane (UP) transport layer information allocated at AI entity1, where each UP transport layer information may include a GTP Tunnel IP address and/or a GTP Tunnel Endpoint Identifier.

Step 2: After receiving the request message sent by the AI entity1, the AI entity2 server saves the one or more UP transport layer information sent by AI entity1, and send a response message (e.g., AI interface Setup Response, F1 setup response, Xn setup response, or NG setup response, etc.,) to the AI entity1. The response message may carry one or more UP transport layer information allocated at AI entity2, where each UP transport layer information may include a GTP Tunnel IP address and/or a GTP Tunnel Endpoint Identifier.

The GTP Tunnel IP address provided by the AI entity2 in each UP transport layer information in the response message is different from the GTP Tunnel IP address provided by the AI entity1 in each UP transport layer information in the request message. In some embodiments, the GTP Tunnel Endpoint Identifier provided by the AI entity2 in each UP transport layer information in the response message may be entirely the same, or partially the same, or different from the GTP Tunnel Endpoint Identifier provided by the AI entity1 in each UP transport layer information in the request message. For example, if the AI entity1 send request message with two UP transport layer information {(IP1 #,endpoint1); (IP #2, endpoint2)}, such a message can indicate to AI entity2 that the AI entity1 is requesting that two tunnels be established and that AI entity2 is expected to return two tunnel addresses allocated at AI entity2. Continuing with this example, the AI entity2 may send a response message comprising two UP transport layer information that may include either {(IP #3,endpoint1) (IP #3, endpoint2)}, or {(IP #3,endpoint3) (IP #3, endpoint4)}, or {(IP #3,endpoint3) (IP #4, endpoint4)} to establish two tunnels with AI entity1.

After Step 1 and Step 2, one or more user plane GTP tunnels for the common AI interface are established, and both AI entities can transmit AI application level data needed between the AI entities over the AI interface.

As shown in FIG. 1, Steps 3 and 4 may be optionally performed in some embodiments as further described below:

Step 3: The AI entity1 sends an object specific request message (e.g., UE AI interface Setup Request, SN addition request, or UE context setup request, etc.,) to the AI entity2 to establish one or more AI interface to exchange AI-related data of specific object between AI entity1 and AI entity2. The request message may carry one or more UP transport layer information, and optionally carries one or more object identifiers, each object identifier may be associated with one or more UP transport layer information to indicate which object data the corresponding AI interface is used to transmit, and where each UP transport layer information may include a GTP Tunnel IP address and/or a GTP Tunnel Endpoint Identifier. In some embodiments, the object identifier may include the UE identifier, or the Cell identifier, or the slice identifier, or the base station (e.g., eNB or gNB) identifier, or the AI session identifier, or the measurement identifier, or the QoS flow identifier.

Step 4: After receiving the object specific request message sent by the AI entity1, the AI entity2 saves or stores the UP transport layer information allocated at AI entity1, and send a response message (e.g., UE AI interface Setup response, SN addition response, or UE context setup response, etc.,) to the AI entity1. The response message may carry one or more UP transport layer information, and optionally carries one or more object identifiers, each object identifier is associated with one or more UP transport layer information to indicate which object data the corresponding AI interface is used to transmit, and where each UP transport layer information includes a GTP Tunnel IP address and/or a GTP Tunnel Endpoint Identifier.

After Step 3 and Step 4, one or more GTP tunnel AI interfaces for a specific object is established, the AI entity can transmit AI application level data associated with such object between the AI entities over such AI interface(s).

II. Embodiment 2—Establishing AI Interface Over Control Plane

Figure 3:
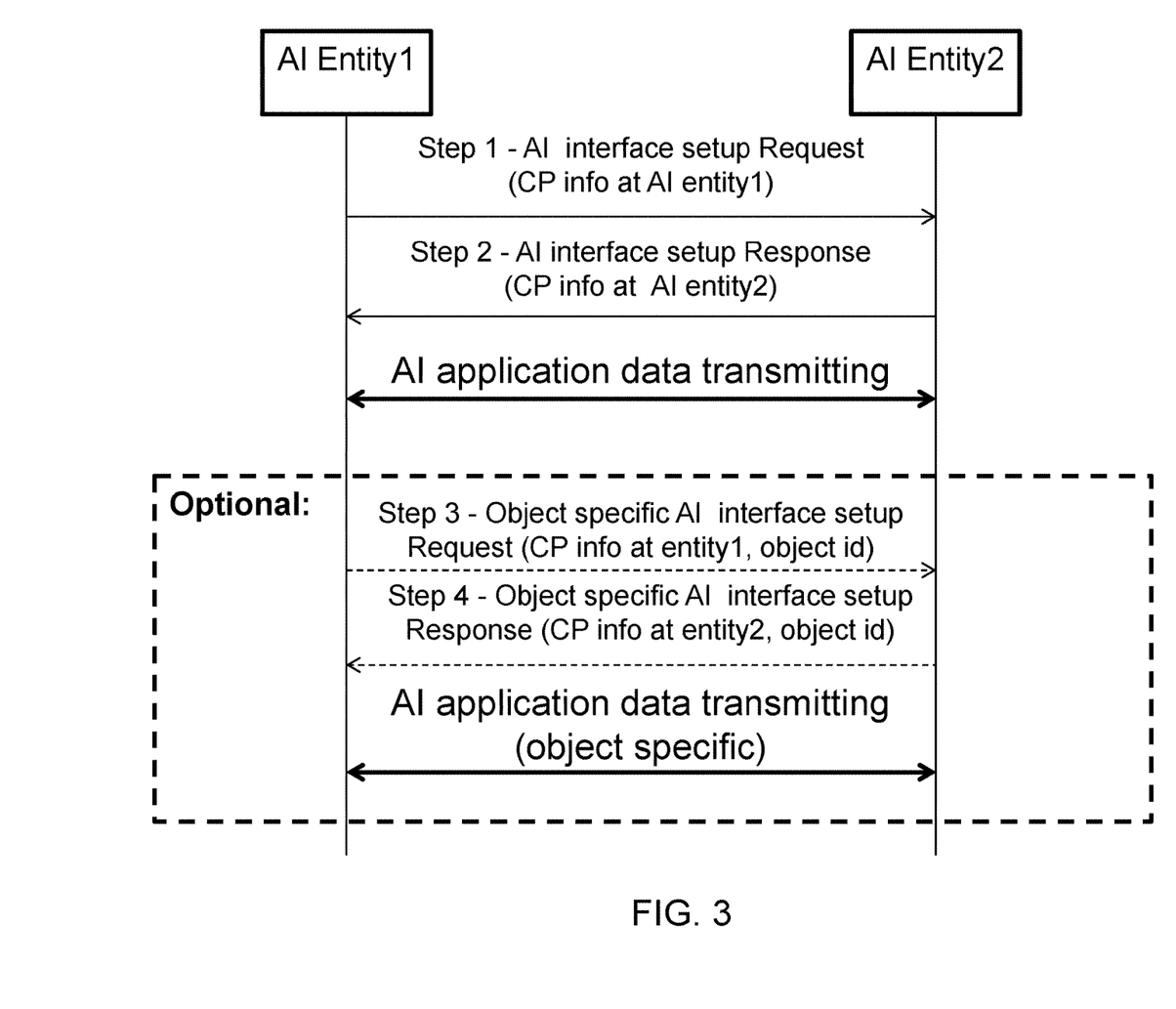
FIG. 3 shows an example flow diagram for establishing an AI interface over control plane between two AI entities.

FIG. 3 shows an example flow diagram for establishing an AI interface over control plane between two AI entities. In some embodiments, one of the purposes of the AI interface Setup procedure is to establish an interface over SCTP to exchange AI application level data between the AI entities. There may be one or more common AI interface instances established to transmit all AI-related data between two AI entities, and one or more specific object level AI interface instances established to transmit AI-related data of the corresponding object between two AI entities. The steps shown in FIG. 3 are further described below.

Step 1: The AI entity1 sends a request message (e.g., AI interface Setup Request, F1 setup request, Xn setup request, or NG setup request, etc.,) to the AI entity2 to establish one or more common AI interface to exchange AI application level data between AI entity1 and AI entity2. The request message may carry one or more CP Transport Layer Addresses allocated at AI entity1, where each CP Transport Layer Address may include two IP addresses used for the SCTP connection, and one SCTP port number.

Step 2: After receiving the request message sent by the AI entity1, the AI entity2 server saves the one or more CP Transport Layer Addresses sent by AI entity1, and send a response message (e.g., AI interface Setup Response, F1 setup response, Xn setup response, or NG setup response, etc.,) to the AI entity1. The response message carries one or more CP Transport Layer Addresses stored at AI entity2, where each CP Transport Layer Address may include two IP addresses used for the SCTP connection, and one SCTP port number.

For an AI interface based on a SCTP connection, each AI entity can provide two different IP addresses and one port number for a SCTP connection. The two IP addresses provided by the AI entity2 in each CP Transport Layer Address in the response message can be different from the two IP addresses provided by the AI entity1 in each CP Transport Layer Address in the request message, and the port number provided by the AI entity2 in each CP Transport Layer Address in the response message can be the same as the port number provided by the AI entity1 in each CP Transport Layer Address in the request message. For example, if the AI entity1 send request message with CP Transport Layer Address information {(IP #1,IP #2,port #1); (IP #3,IP #4, port #2); (IP #5,IP #6, port #2)}, such a message can indicate to AI entity2 that the AI entity1 is requesting that three SCTP connections (or three control plane AI interfaces) be established and that AI entity2 is expected to return three CP Transport Layer Addresses allocated at AI entity2. Continuing with this example, the AI entity2 may send a response message comprising three CP Transport Layer Address that may include either {(IP #7,IP #8,port #1); (IP #9,IP #10, port #2); (IP #11,IP #12, port #2)} to establish three SCTP connections with AI entity1]

After Step 1 and Step 2, one or more control plane for the common AI interface are established, the AI entity can transmit AI application level data needed between the AI entities over the AI interface.

As shown in FIG. 3, Steps 3 and 4 may be optionally performed in some embodiments as further described below.

Step 3: The AI entity1 sends a request message (e.g., UE AI interface Setup Request, SN addition request, or UE context setup request, etc.,) to the AI entity2 to establish one or more AI interface to exchange AI-related data of specific object between AI entity1 and AI entity2. The request message may carry one or more CP Transport Layer Address, and optionally carries one or more object identifiers, each object identifier is associated with one or more CP Transport Layer Addresses to indicate which object data the corresponding AI interface is used to transmit, and where each CP Transport Layer Address includes two IP addresses used for the SCTP connection, and one SCTP port number. In some embodiments, the object identifier may include the UE identifier, or the Cell identifier, or the slice identifier, or the base station (e.g., eNB or gNB) identifier, or the AI session identifier, or the measurement identifier, or the QoS flow identifier.

Step 4: After receiving the request message sent by the AI entity1, the AI entity2 saves or stores the CP Transport Layer Address allocated at AI entity1, and send a response message (e.g., UE AI interface Setup response, SN addition response, or UE context setup response, etc.,) to the AI entity1. The response message carries one or more CP Transport Layer Address, and optionally carries one or more object identifiers, each object identifier is associated with one or more CP Transport Layer Addresses to indicate which object data the corresponding AI interface is used to transmit, and where each CP Transport Layer Address includes two IP addresses used for the SCTP connection, and one SCTP port number.

After Step 3 and Step 4, one or more control plane AI interfaces for a specific object is established, the AI entity can transmit AI application level data associated with such object between the AI entities over such AI interface(s).

III. Embodiment 3—Exchange AI Data Over AI Interface

Figure 4:
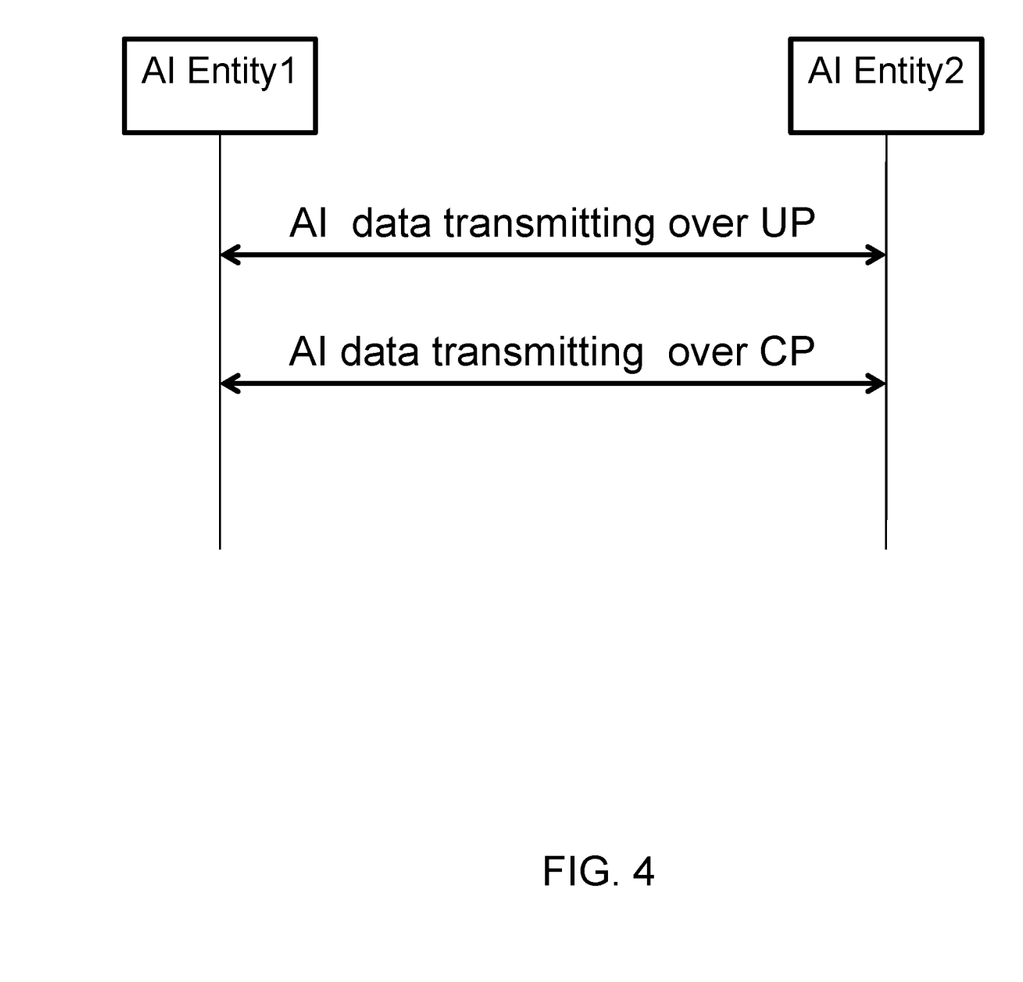
FIG. 4 shows an example flow diagram for transmitting data over user plane and/or control plane between two AI entities.

FIG. 4 shows an example flow diagram for transmitting data over user plane and/or control plane between two AI entities. An AI entity (e.g., AI entity1 and/or AI entity2) transmits/receives all AI-related data over one or more AI interface over the user plane; or the AI entity transmits/receives all AI-related data over one or more AI interface over the control plane; or the AI entity transmits/receives some AI-related data over one or more AI interface over the user plane, and transmits/receives other AI-related data over one or more AI interface over the control plane.

The AI entity may transmits/receives packet over AI interface over user plane, where the packet may be generated using a pre-defined GTP-U format and may include at least one of the following information in the GTP-U header:

The payload type, which is used to indicate whether the payload of the packet includes AI related data, or AI related control message, or non-AI data;

The AI message type, which is used to indicate which AI related control message is included in payload;

Encode/decode method type, which is used to indicate how to decode the payload;

Object ID, which may be used to indicate the object to which the payload is related or associated (e.g. the object may be UE, Cell, slice, gNB, AI session, measurement session, or Quality of Service (QoS) flow).

The AI entity transmits/receives packet over AI interface over control plane, where the packet may be generated using a pre-defined SCTP format and may include at least one of the following information in the SCTP payload:

The payload type, which is used to indicate whether the payload of the packet includes AI related data, or AI related control message, or non-AI data;

The AI message type, which is used to indicate which AI related control message is included in payload;

Encode/decode method type, which is used to indicate how to decode the payload;

Object ID, which may be used to indicate the object to which the payload is related or associated (e.g. the object may be UE, Cell, slice, gNB, AI session, measurement session, or QoS flow).

Figure 5:
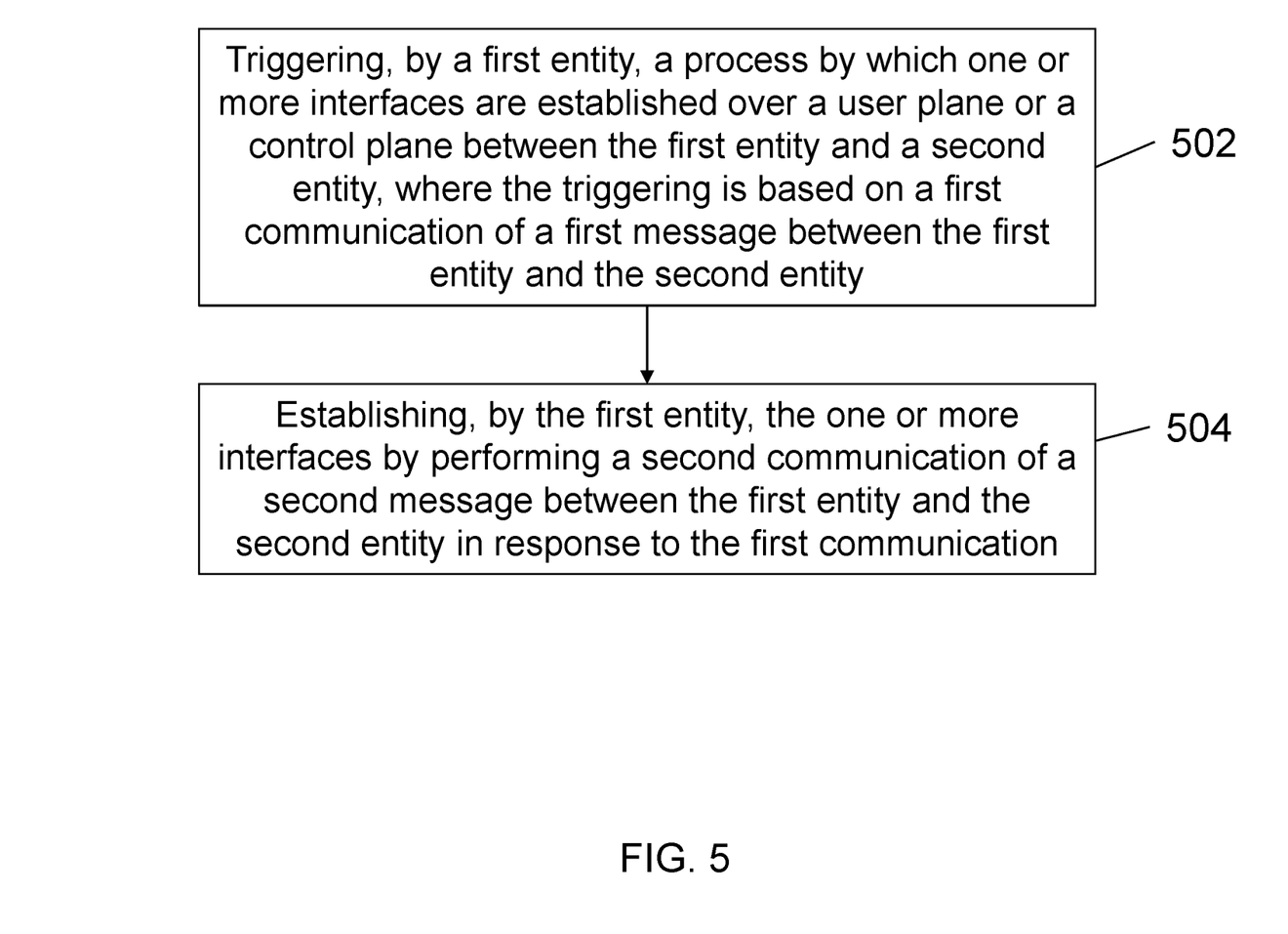
FIG. 5 shows an exemplary flowchart for establishing one or more interface between two entities.

FIG. 5 shows an exemplary flowchart for establishing one or more interface between two entities. Operation 502 includes triggering, by a first entity, a process by which one or more interfaces are established over a user plane or a control plane between the first entity and a second entity, where the triggering is based on a first communication of a first message between the first entity and the second entity, and where the one or more interfaces are used for data communication between the first entity and the second entity. Operation 504 includes establishing, by the first entity, the one or more interfaces by performing a second communication of a second message between the first entity and the second entity in response to the first communication.

In some embodiments, the one or more interfaces are established over the user plane, the first message comprises a first set of one or more user plane (UP) transport layer information, the second message comprises a second set of one or more UP transport layer information, and each UP transport layer information in the first set and the second set indicates an interface and comprises a General Packet Radio Service (GPRS) Tunneling Protocol (GTP) tunnel Internet Protocol (IP) address and a GTP tunnel endpoint identifier. In some embodiments, at least one UP transport layer information in the first set or the second set comprises an object identifier that identifies an object for which data is transmitted or received via an interface indicated by the at least one UP transport layer information. In some embodiments, the object identifier includes a User Equipment (UE) identifier, a cell identifier, a slice identifier, a base station identifier, an Artificial Intelligence (AI) session identifier, a measurement identifier, or a Quality of Service (QoS) flow identifier.

In some embodiments, the first set of one or more UP transport layer information comprises a first set of one or more GTP IP addresses that are different from a second set of one or more GTP IP addresses included in the second set of one or more UP transport layer information. In some embodiments, the first set of one or more UP transport layer information comprises a first set of one or more GTP tunnel endpoint identifiers, the second set of one or more UP transport layer information comprises a second set of one or more GTP tunnel endpoint identifiers, and the first set of one or more GTP tunnel endpoint identifiers are different from the second set of one or more GTP tunnel endpoint identifiers, or at least some of the first set of one or more GTP tunnel endpoint identifiers are same as the second set of one or more GTP tunnel endpoint identifiers.

In some embodiments, the one or more interfaces are established over the control plane, the first message comprises a first set of one or more Control Plane (CP) transport layer addresses, the second message comprises a second set of one or more CP transport layer addresses, and each CP transport layer address in the first set and the second set indicates an interface and comprises two Internet Protocol (IP) addresses associated with establishing Stream Control Transmission Protocol (SCTP) connection and one SCTP port number.

In some embodiments, at least one CP transport layer address in the first set or the second set comprises an object identifier that identifies an object for which data is transmitted or received via an interface indicated by the at least one CP transport layer address. In some embodiments, the object identifier includes a User Equipment (UE) identifier, a cell identifier, a slice identifier, a base station identifier, an Artificial Intelligence (AI) session identifier, a measurement identifier, or a Quality of Service (QoS) flow identifier. In some embodiments, all of the data communication between the first entity and the second entity are performed over the one or more interfaces established over the user plane, or all of the data communication between the first entity and the second entity are performed over the one or more interfaces established over the control plane, or at least some the data communication between the first entity and the second entity are performed over a first interface established over the user plane and at least some of the data communication between the first entity and the second entity are performed over a second interface established over the control plane.

In some embodiments, the data communication is performed over the user plane by using a packet having a pre-defined General Packet Radio Service (GPRS) Tunneling Protocol-User (GTP-U) format. In some embodiments, the packet having the GTP-U format includes a GTP-U header that comprises one or more of: a payload type that indicates whether a payload of the packet includes Artificial Intelligence (AI) related data, or AI related control message, or data that is not related to AI, an AI message type that indicates which AI related control message is included in the payload, an encode or decode method type that identifies a technique with which to decode the payload, and an object identifier that indicates an object to which the payload is related or associated. In some embodiments, the object includes a User Equipment (UE), a cell, a slice, a base station, an AI session, a measurement session, or a Quality of Service (QoS) flow. In some embodiments, the data communication is performed over the control plane by using a packet having a Stream Control Transmission Protocol (SCTP) format. In some embodiments, the packet having the SCTP format includes a payload that comprises one or more of: a payload type that indicates whether the payload of the packet includes Artificial Intelligence (AI) related data, or AI related control message, or data that is not related to AI, an AI message type that indicates which AI related control message is included in the payload, an encode or decode method type that identifies a technique with which to decode the payload, and an object identifier that indicates an object to which the payload is related or associated.

In some embodiments, the object includes a User Equipment (UE), a cell, a slice, a base station, an AI session, a measurement session, or a Quality of Service (QoS) flow. In some embodiments, the first entity comprises a first artificial intelligence (AI) operated entity, and the second entity comprises a second AI operated entity. In some embodiments, the first entity or the second entity are located in a radio access network (RAN) network node or in a core network or in an Operations, Administration and Maintenance (OAM) server.

Figure 6:
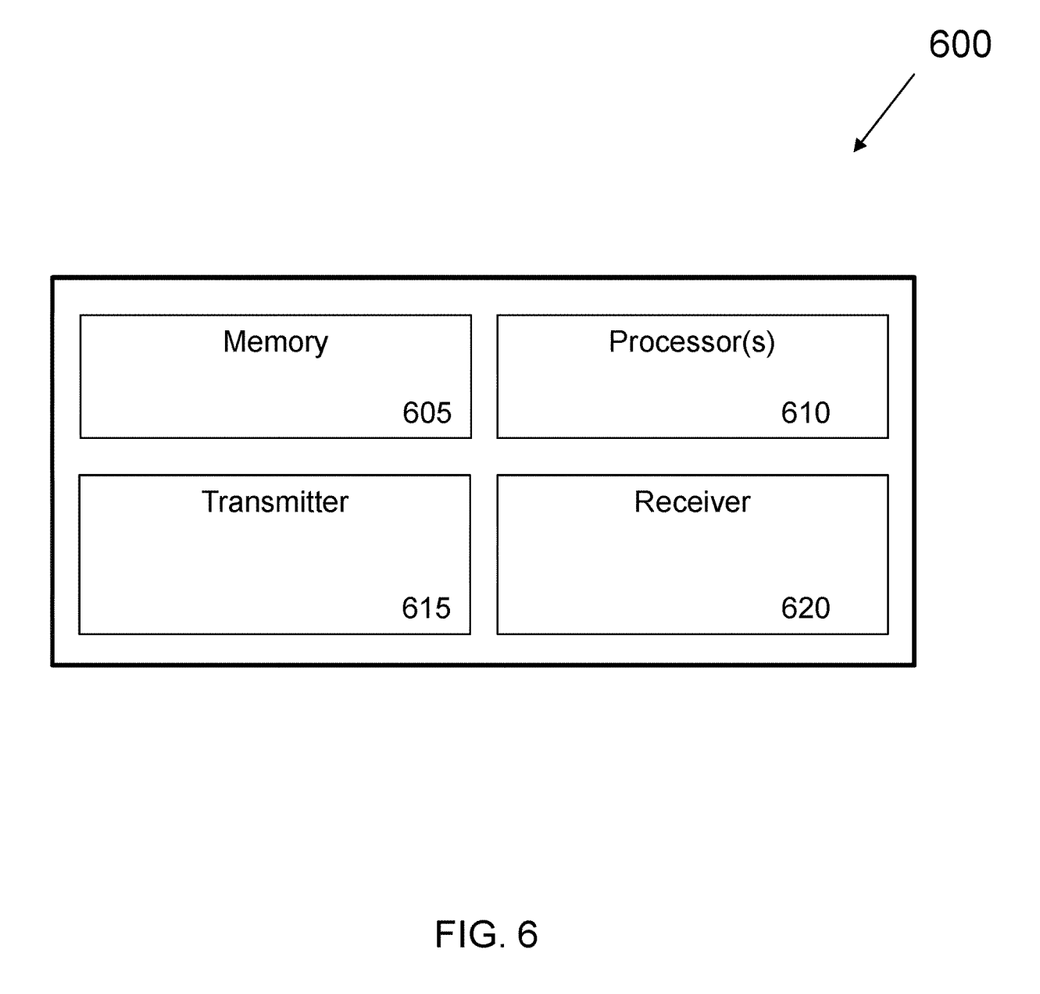
FIG. 6 shows an exemplary block diagram of a hardware platform that may be a part of a network node or a user equipment.

FIG. 6 shows an exemplary block diagram of a hardware platform 600 that may be a part of a network node (e.g., eNB or base station or core network). The hardware platform 600 includes at least one processor 610 and a memory 605 having instructions stored thereupon. The instructions upon execution by the processor 610 configure the hardware platform 600 to perform the operations described in FIGS. 1 to 5 and in the various embodiments described in this patent document. The transmitter 615 transmits or sends information or data to another node. For example, a network node transmitter can send a message to another network node. The receiver 620 receives information or data transmitted or sent by another node. For example, a base station network node can receive a message from a core network.

The following section describes example techniques to enable and/or perform AI data transmission:

Clause 1—A method for AI data transmission, comprising: to establish one or more AI interface instances between two AI entities, where the AI interface is over the user plane or the control plane; and the AI entity transmits AI related data over the AI interface to another AI entity, and receives AI related data over the AI interface from another AI entity.

Clauses 2 and 3 can setup one or more AI interface over user plane

Clause 2—The method of clause 1, comprising: the AI entity sends a request message to another AI entity to establish one or more AI interface over the user plane between two AI entities. The request message carries one or more UP transport layer information at the sending AI entity, and optionally carries one or more object identifiers, each object identifier is associated with one or more UP transport layer information to indicate which object data the corresponding AI interface is used to transmit; and the AI entity receives a response message from another AI entity, The response message carries one or more UP transport layer information at another AI entity, and optionally carries one or more object identifiers, each object identifier is associated with one or more UP transport layer information.

Clause 3—The method of clause 2, comprising: the UP transport layer information at AI entity includes at least one of the following information: a GTP Tunnel IP address, a GTP Tunnel Endpoint Identifier.

Clauses 4-5 can setup one or more AI interfaces over control plane

Clause 4—The method of clause 1, comprising: the AI entity sends a request message to another AI entity to establish one or more AI interface over the control plane between two AI entities. The request message carries one or more CP Transport Layer Address at the sending AI entity, and optionally carries one or more object identifiers, each object identifier is associated with one or more CP Transport Layer Addresses to indicate which object data the corresponding AI interface is used to transmit; and the AI entity receives a response message from another AI entity, The response message carries one or more CP Transport Layer Address at another AI entity, and optionally carries one or more object identifiers, each object identifier is associated with one or more CP Transport Layer Addresses.

Clause 5—The method of clause 4, comprising: the CP Transport Layer Address at AI entity includes two IP address used for the SCTP connection, and one SCTP port number.

Clause 6 describes the object identifier, and clause 7 describes transmitting over AI interface: only over UP; only over CP; over both UP&CP.

Clause 6—The method of clauses 2, 4, comprising: the object identifier is the UE identifier, or the Cell identifier, or the slice identifier, or the gNB identifier, or the AI session identifier, or the measurement identifier, or the Qos flow identifier.

Clause 7—The method of clause 1, comprising: the AI entity transmits/receives all AI-related data over one or more AI interface over the user plane; or The AI entity transmits/ receives all AI-related data over one or more AI interface over the control plane; or The AI entity transmits/receives some AI-related data over one or more AI interface over the user plan, and transmits/receives other AI-related data over one or more AI interface over the control plane.

Clause 8 describes an example user plane packet format, and clause 9 describes an example control plane packet format:

Clause 8 The method of clause 1, comprising: the AI entity transmits/receives packet over AI interface over user plan, where the packet is GTP-U format and including at least one of the following information in the GTP-U header:

The payload type, which is used to indicate whether the load is AI data, or AI control message, or non-AI data;
The AI message type, which is used to indicate which AI control message contained in payload;
Code/decode method type, which is used to indicate how to decode the payload;
Object ID, which is used to indicate the payload are relate to which object (e.g. UE, Cell, slice, gNB, AI session, measurement session, QoS flow).

Clause 9—The method of clause 2, comprising: the AI entity transmits/receives packet over AI interface over control plan, where the packet is SCTP format and including at least one of the following information in the SCTP payload:

The payload type, which is used to indicate whether the load is AI data, or AI control message, or non-AI data;
The AI message type, which is used to indicate which AI control message contained in payload;
Code/decode method type, which is used to indicate how to decode the payload;
Object ID, which is used to indicate the payload are relate to which object (e.g. UE, Cell, slice, gNB, AI session, measurement session, QoS flow).

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
triggering, by a first entity, a process by which one or more interfaces are established over a user plane or a control plane between the first entity and a second entity,
wherein the triggering is based on a first communication of a first message between the first entity and the second entity,
wherein the one or more interfaces are used for data communication between the first entity and the second entity, and
wherein the first entity or the second entity are located in a radio access network (RAN) network node or in a core network or in an Operations, Administration and Maintenance (OAM) server; and
establishing, by the first entity, the one or more interfaces by performing a second communication of a second message between the first entity and the second entity in response to the first communication,
wherein the one or more interfaces are established over the user plane,
wherein the first message comprises a first set of one or more user plane (UP) transport layer information,
wherein the second message comprises a second set of one or more UP transport layer information, and
wherein each UP transport layer information in the first set and the second set indicates an interface and comprises a General Packet Radio Service (GPRS) Tunneling Protocol (GTP) tunnel Internet Protocol (IP) address and a GTP tunnel endpoint identifier.

2. The method of claim 1,
wherein at least one UP transport layer information in the first set or the second set comprises an object identifier that identifies an object for which data is transmitted or received via an interface indicated by the at least one UP transport layer information, and
wherein the object identifier includes a User Equipment (UE) identifier, a cell identifier, a slice identifier, a base station identifier, an Artificial Intelligence (AI) session identifier, a measurement identifier, or a Quality of Service (QOS) flow identifier.

3. The method of claim 1, wherein the first set of one or more UP transport layer information comprises a first set of one or more GTP IP addresses that are different from a second set of one or more GTP IP addresses included in the second set of one or more UP transport layer information.

4. The method of claim 1,
wherein the first set of one or more UP transport layer information comprises a first set of one or more GTP tunnel endpoint identifiers,
wherein the second set of one or more UP transport layer information comprises a second set of one or more GTP tunnel endpoint identifiers, and
wherein the first set of one or more GTP tunnel endpoint identifiers are different from the second set of one or more GTP tunnel endpoint identifiers, or at least some of the first set of one or more GTP tunnel endpoint identifiers are same as the second set of one or more GTP tunnel endpoint identifiers.

5. A wireless communication method, comprising:
triggering, by a first entity, a process by which one or more interfaces are established over a user plane or a control plane between the first entity and a second entity,
wherein the triggering is based on a first communication of a first message between the first entity and the second entity,
wherein the one or more interfaces are used for data communication between the first entity and the second entity, and
wherein the first entity or the second entity are located in a radio access network (RAN) network node or in a core network or in an Operations, Administration and Maintenance (OAM) server; and
establishing, by the first entity, the one or more interfaces by performing a second communication of a second message between the first entity and the second entity in response to the first communication,
wherein the one or more interfaces are established over the control plane,
wherein the first message comprises a first set of one or more Control Plane (CP) transport layer addresses,
wherein the second message comprises a second set of one or more CP transport layer addresses, and
wherein each CP transport layer address in the first set and the second set indicates an interface and comprises two Internet Protocol (IP) addresses associated with establishing Stream Control Transmission Protocol (SCTP) connection and one SCTP port number.

6. The method of claim 5,
wherein at least one CP transport layer address in the first set or the second set comprises an object identifier that identifies an object for which data is transmitted or received via an interface indicated by the at least one CP transport layer address, and
wherein the object identifier includes a User Equipment (UE) identifier, a cell identifier, a slice identifier, a base station identifier, an Artificial Intelligence (AI) session identifier, a measurement identifier, or a Quality of Service (QOS) flow identifier.

7. The method of claim 1,
wherein all of the data communication between the first entity and the second entity are performed over the one or more interfaces established over the user plane, or
wherein all of the data communication between the first entity and the second entity are performed over the one or more interfaces established over the control plane, or
wherein at least some the data communication between the first entity and the second entity are performed over a first interface established over the user plane and at least some of the data communication between the first entity and the second entity are performed over a second interface established over the control plane.

8. The method of claim 1, wherein the data communication is performed over the user plane by using a packet having a pre-defined General Packet Radio Service (GPRS) Tunneling Protocol-User (GTP-U) format.

9. The method of claim 8, wherein the packet having the GTP-U format includes a GTP-U header that comprises one or more of:
a payload type that indicates whether a payload of the packet includes Artificial Intelligence (AI) related data, or AI related control message, or data that is not related to AI,
an AI message type that indicates which AI related control message is included in the payload,
an encode or decode method type that identifies a technique with which to decode the payload, and
an object identifier that indicates an object to which the payload is related or associated.

10. The method of claim 1, wherein the data communication is performed over the control plane by using a packet having a Stream Control Transmission Protocol (SCTP) format.

11. The method of claim 10, wherein the packet having the SCTP format includes a payload that comprises one or more of:
a payload type that indicates whether the payload of the packet includes Artificial Intelligence (AI) related data, or AI related control message, or data that is not related to AI,
an AI message type that indicates which AI related control message is included in the payload,
an encode or decode method type that identifies a technique with which to decode the payload, and
an object identifier that indicates an object to which the payload is related or associated.

12. The method of claim 1, wherein the first entity comprises a first artificial intelligence (AI) operated entity, and wherein the second entity comprises a second AI operated entity.

13. A first entity for wireless communication, comprising:
a processor configured to implement a method, the processor configured to:
trigger a process by which one or more interfaces are established over a user plane or a control plane between the first entity and a second entity,
wherein the trigger is based on a first communication of a first message between the first entity and the second entity, wherein the one or more interfaces are used for data communication between the first entity and the second entity, and wherein the first entity or the second entity are located in a radio access network (RAN) network node or in a core network or in an Operations, Administration and Maintenance (OAM) server; and establish the one or more interfaces by a performance of a second communication of a second message between the first entity and the second entity in response to the first communication, wherein the one or more interfaces are established over the user plane, wherein the first message comprises a first set of one or more user plane (UP) transport layer information, wherein the second message comprises a second set of one or more UP transport layer information, and wherein each UP transport layer information in the first set and the second set indicates an interface and comprises a General Packet Radio Service (GPRS) Tunneling Protocol (GTP) tunnel Internet Protocol (IP) address and a GTP tunnel endpoint identifier.

14. The first entity of claim 13,
wherein at least one UP transport layer information in the first set or the second set comprises an object identifier that identifies an object for which data is transmitted or received via an interface indicated by the at least one UP transport layer information, and
wherein the object identifier includes a User Equipment (UE) identifier, a cell identifier, a slice identifier, a base station identifier, an Artificial Intelligence (AI) session identifier, a measurement identifier, or a Quality of Service (QOS) flow identifier.

15. The first entity of claim 13, wherein the first set of one or more UP transport layer information comprises a first set of one or more GTP IP addresses that are different from a second set of one or more GTP IP addresses included in the second set of one or more UP transport layer information.

16. The first entity of claim 13,
wherein the first set of one or more UP transport layer information comprises a first set of one or more GTP tunnel endpoint identifiers,
wherein the second set of one or more UP transport layer information comprises a second set of one or more GTP tunnel endpoint identifiers, and
wherein the first set of one or more GTP tunnel endpoint identifiers are different from the second set of one or more GTP tunnel endpoint identifiers, or at least some of the first set of one or more GTP tunnel endpoint identifiers are same as the second set of one or more GTP tunnel endpoint identifiers.

17. A first entity for wireless communication, comprising:
a processor configured to implement a method, the processor configured to:
trigger a process by which one or more interfaces are established over a user plane or a control plane between the first entity and a second entity, wherein the trigger is based on a first communication of a first message between the first entity and the second entity, wherein the one or more interfaces are used for data communication between the first entity and the second entity, and wherein the first entity or the second entity are located in a radio access network (RAN) network node or in a core network or in an Operations, Administration and Maintenance (OAM) server; and establish the one or more interfaces by a performance of a second communication of a second message between the first entity and the second entity in response to the first communication, wherein the one or more interfaces are established over the control plane, wherein the first message comprises a first set of one or more Control Plane (CP) transport layer addresses, wherein the second message comprises a second set of one or more CP transport layer addresses, and wherein each CP transport layer address in the first set and the second set indicates an interface and comprises two Internet Protocol (IP) addresses associated with an establishment of Stream Control Transmission Protocol (SCTP) connection and one SCTP port number.

18. The first entity of claim 17,
wherein at least one CP transport layer address in the first set or the second set comprises an object identifier that identifies an object for which data is transmitted or received via an interface indicated by the at least one CP transport layer address, and
wherein the object identifier includes a User Equipment (UE) identifier, a cell identifier, a slice identifier, a base station identifier, an Artificial Intelligence (AI) session identifier, a measurement identifier, or a Quality of Service (QOS) flow identifier.

19. The first entity of claim 13,
wherein all of the data communication between the first entity and the second entity are performed over the one or more interfaces established over the user plane, or
wherein all of the data communication between the first entity and the second entity are performed over the one or more interfaces established over the control plane, or
wherein at least some the data communication between the first entity and the second entity are performed over a first interface established over the user plane and at least some of the data communication between the first entity and the second entity are performed over a second interface established over the control plane.

20. The first entity of claim 13, wherein the data communication is performed over the user plane by using a packet having a pre-defined General Packet Radio Service (GPRS) Tunneling Protocol-User (GTP-U) format.

* * * * *